(12) United States Patent
Noma et al.

(10) Patent No.: US 7,664,539 B2
(45) Date of Patent: Feb. 16, 2010

(54) FOLDABLE PORTABLE TERMINAL

(75) Inventors: Kenichi Noma, Higashiosaka (JP); Nobuaki Kobayashi, Takarazuka (JP); Masuo Tanaka, Nabari (JP); Shinichi Yamamoto, Osaka (JP); Motoaki Mushika, Hashima (JP); Kiyotada Kawakami, Osaka (JP); Atsumi Okamoto, Ikoma (JP)

(73) Assignee: Kyocera Corporation, Kyoto (JP)

( * ) Notice: Subject to any disclaimer, the term of this patent is extended or adjusted under 35 U.S.C. 154(b) by 83 days.

(21) Appl. No.: 10/578,346

(22) PCT Filed: Nov. 5, 2004

(86) PCT No.: PCT/JP2004/016807

§ 371 (c)(1),
(2), (4) Date: May 5, 2006

(87) PCT Pub. No.: WO2005/046187

PCT Pub. Date: May 19, 2005

(65) Prior Publication Data

US 2007/0087793 A1 Apr. 19, 2007

(30) Foreign Application Priority Data

| Nov. 6, 2003 | (JP) | ............................. 2003-377146 |
| Nov. 10, 2003 | (JP) | ............................. 2003-379230 |
| Jan. 29, 2004 | (JP) | ............................. 2004-022113 |

(51) Int. Cl.
 H04M 1/00 (2006.01)
 H04B 1/38 (2006.01)
(52) U.S. Cl. ............... 455/575.1; 455/575.2; 455/575.3; 455/575.4; 455/575.5; 455/575.6; 455/575.7; 455/575.8; 455/575.9; 455/90.1; 455/90.2; 455/90.3
(58) Field of Classification Search ... 455/575.1–575.9, 455/90.1–90.3
See application file for complete search history.

(56) References Cited

U.S. PATENT DOCUMENTS 6,731,912 B1 * 5/2004 Miyashita .................. 455/90.2

(Continued)

FOREIGN PATENT DOCUMENTS

JP 02-309798 12/1990

(Continued)

OTHER PUBLICATIONS

International Search Report of PCT/JP2004/016808 date of mailing Dec. 14, 2004.

(Continued)

*Primary Examiner*—Vivian Chin
*Assistant Examiner*—George C Monikang
(74) *Attorney, Agent, or Firm*—Morrison & Foerster LLP

(57) ABSTRACT

A foldable portable terminal of the present invention includes a body cabinet 1 provided with a microphone 14 and a cover cabinet 2 provided with first and second speakers 41, 42, openably/closably coupled to each other. Any one or both of the cabinets are provided with closing means for closing a sound emitting hole 22a of the first speaker in a closed state of the both cabinets. Alternatively, a partition wall for partitioning the first speaker and the second speaker is formed inside the cover cabinet. Alternatively, the body cabinet has an inner surface provided with a transmission unit 6 incorporating a microphone 63 and being rotatable between a first rotational posture where the unit faces the inner surface side of the body cabinet and a second rotational posture where the unit faces a direction deviating from the cover cabinet in a closed position.

11 Claims, 13 Drawing Sheets

U.S. PATENT DOCUMENTS

| | | | |
|---|---|---|---|
| 6,957,083 B2 * | 10/2005 | Ikeda et al. | 455/556.1 |
| 2004/0132514 A1 * | 7/2004 | Lee | 455/575.3 |
| 2004/0180705 A1 * | 9/2004 | Komiyama | 455/575.3 |
| 2004/0198476 A1 | 10/2004 | Aikawa et al. | |
| 2004/0248625 A1 | 12/2004 | Yoshida et al. | |

FOREIGN PATENT DOCUMENTS

| | | |
|---|---|---|
| JP | 11-308314 | 11/1999 |
| JP | 2001-211241 | 8/2001 |
| JP | 2002-023483 | 1/2002 |
| JP | 2002-164978 | 6/2002 |
| JP | 2002-358088 | 12/2002 |
| JP | 2003-18257 | 1/2003 |
| JP | 2003-018267 | 1/2003 |
| JP | 2003-51871 | 2/2003 |
| JP | 2003-134201 | 5/2003 |
| JP | 2003-152838 | 5/2003 |
| JP | 2003-198696 | 7/2003 |
| JP | 2003-304312 | 10/2003 |

OTHER PUBLICATIONS

Office Action from Japanese Patent Publication No. 2004-022113, mailed on Jul. 2, 2009.

Office Action from Japanese Patent Publication No. 2003-377146, mailed on Jul. 3, 2009.

Office Action from Japanese Patent Publication No. 2003-379230, mailed on Jul. 6, 2009.

* cited by examiner (a)

(b)

FOLDABLE PORTABLE TERMINAL

TECHNICAL FIELD

The present invention relates to a foldable portable terminal, such as a foldable portable telephone, including a pair of flat cabinets openably/closably coupled to each other, and particularly to a foldable portable terminal having a hands-free function, which allows communication with the both cabinets closed.

BACKGROUND ART

In recent years, foldable portable telephones have been making progress in multi-functionalization along with being made smaller and thinner. Development is in progress of foldable portable telephones with a hands-free function, which allow communication and message transmission and reception even with the both cabinets closed and placed on a desk (see, for example, JP 2003-18257, A, JP 2003-51871, A and JP 2003-134201, A).

A foldable portable telephone shown in for example FIG. 17 and FIG. 18 has been proposed as a foldable portable telephone having a hands-free function.

The foldable portable telephone includes a body cabinet 8 and a cover cabinet 9 openably/closably coupled to each other through a hinge mechanism 83. A plurality of manual keys 81 and a transmitter 82 are disposed on an inner surface of the body cabinet 8, while a microphone 84 is disposed inside the body cabinet 8 toward the transmitter 82.

The cover cabinet 9 has an inner surface provided with a main display 91 and a first receiver 92 disposed in a position to be opposed to the transmitter 82 with the both cabinets 8, 9 closed. A second receiver 93 is disposed on a rear surface of the cover cabinet 9. The cover cabinet 9 has an interior provided with a first speaker 94 disposed toward the first receiver 92 and a second speaker 95 disposed toward the second receiver 93.

A first projection 85 projects near the transmitter 82 of the body cabinet 8, while a second projection 96 projects near the first receiver 92 of the cover cabinet 9, the both projections 85, 96 being in contact with each other with the both cabinets 8, 9 closed.

With the foldable portable telephone, when the both cabinets 8, 9 are closed as shown in FIG. 18, a cabinet open/close detector (not shown) detects that the both cabinets 8, 9 are closed to feed a detection signal based on the detection to a control circuit (not shown). The control circuit causes the microphone 84 and the second speaker 95 to function in response to the detection signal. Consequently, speech transmission and reception using the microphone 84 and the second speaker 95 become possible in a hands-free condition where the both cabinets 8, 9 are closed and placed on a desk.

However, with the foldable portable telephone, when speech transmission and reception are performed with the both cabinets 8, 9 closed as shown in FIG. 18, vibration of the second speaker 95 can be transmitted to the first speaker 94 through the air inside the cover cabinet 9 to thereby vibrate the first speaker 94. This can cause the first speaker 94 to emit a sound wave having a waveform approximated to that of a sound wave emitted from the second speaker 95. The sound wave emitted from the first speaker 94 can be transmitted to the microphone 84 because the first speaker 94 is opposed to the microphone 84 through the first receiver 92 and the transmitter 82. Consequently, a loop of an acoustic transmission path can be formed between the second speaker 95 and the microphone 84 through the first speaker 94. This can transmit the other party's voice emitted from the second speaker 95 to the microphone 84 to generate a phenomenon where the voice is transmitted to the other party, i.e., howling, which has been causing a problem of giving the other party displeasure.

Accordingly, an object of the present invention is to prevent or suppress a howling phenomenon in a foldable portable terminal with a hands-free function including an openably/closably coupled pair of cabinets.

DISCLOSURE OF THE INVENTION

A first foldable portable terminal of the present invention comprises a body cabinet 1 and a cover cabinet 2 openably/closably coupled to each other. A first speaker 41 is disposed in the cover cabinet 2. One or more sound emitting holes 22a for passing a sound wave emitted from the first speaker 41 are provided on an inner surface of the cover cabinet 2 in a position opposed to a sound emitting surface of the first speaker 41. One or more openings 12a are provided on an inner surface of the body cabinet 1 in a position to be opposed to the sound emitting holes 22a with the both cabinets 1, 2 closed. A microphone 14 having a sound collecting surface facing the openings 12a is disposed in the body cabinet 1.

A second speaker 42 for emitting a sound wave toward a rear surface of the cover cabinet 2 is disposed in the cover cabinet 2. Any one or both of the cabinets are provided with closing means for closing the sound emitting holes 22a in a closed state of the both cabinets 1, 2.

With the above-described first foldable portable terminal of the present invention, the microphone 14 of the body cabinet 1 and the first speaker 41 of the cover cabinet 2 become opposed to each other through the openings 12a and the sound emitting holes 22a by closing the both cabinets 1, 2. At this time, both of the microphone 14 and the second .speaker 42 face the opposite side of the rear surface of the body cabinet 1. The microphone 14 and the second speaker 42 caused to function in this state allow a user to perform speech transmission and reception with the microphone 14 and the second speaker 42 facing himself.

At this time, a sound wave emitted from the second speaker 42 can be transmitted to the first speaker 41 through the cover cabinet 2 and air inside the cover cabinet 2 to thereby vibrate the first speaker 41. This can cause the first speaker 41 to emit a sound wave having a waveform approximated to that of the sound wave. However, the sound wave is only slightly emitted outside the cover cabinet 2 because the sound emitting holes 22a for emitting the sound wave outside the cover cabinet 2 are closed by the closing means. Further, the sound wave emitted outside the cover cabinet 2 will not be transmitted to the microphone 14 because the sound wave attenuates in the process of passing through the openings 12a to reach inside the body cabinet 1.

When the both cabinets 1, 2 are opened, the closed state of the sound emitting holes 22a with the closing means is released to open the sound emitting holes 22a. The microphone 14 and the first speaker 41 caused to function in this state allow the user to perform speech transmission and reception with his mouth close to the openings 12a and his ear close to the sound emitting holes 22a.

Specifically, the closing means comprises detection means for detecting an open state and a closed state of the both cabinets 1, 2 and a shutter mechanism 7 for opening/closing the sound emitting holes 22a, in accordance with the detection. The shutter mechanism 7 comprises a shutter member 70 supported so as to be capable of entering between opposed faces of the sound emitting surface of the first speaker 41 and the sound emitting holes 22a, and a drive mechanism 72 for reciprocatingly driving the shutter member 70 in accordance with the detection. With operation of the drive mechanism 72, the shutter member 70 enters between the opposed faces to close the sound emitting holes 22a in the closed state of the both cabinets 1, 2, and escapes from between the opposed faces to open the sound emitting holes 22a in the open state of the both cabinets 1, 2.

In the specific construction, when the both cabinets 1, 2 are closed, the detection means detects the closed state of the both cabinets 1, 2 to bring the drive mechanism 72 into operation in accordance with the detection. With the operation, the shutter member 70 enters between the opposed faces of the sound emitting surface of the first speaker 41 and the sound emitting holes 22a to close the sound emitting holes 22a. Consequently, the sound wave emitted from the first speaker 41 with vibration of the second speaker 42 is only slightly emitted outside the cover cabinet 2, so that the sound wave will not be transmitted to the microphone 14 through the openings 12a of the body cabinet 1.

When the both cabinets 1, 2 are opened, the detection means detects the opened state of the both cabinets 1, 2 to bring the drive mechanism 72 into operation in accordance with the detection. With the operation, the shutter member 70 escapes from between the opposed faces. Consequently, the sound emitting holes 22a are opened. The first speaker 41 caused to function in this state leads the sound wave emitted from the first speaker 41 to be emitted outside the cover cabinet 2 through the sound emitting holes 22a. Therefore, the user can hear the other party's voice emitted from the first speaker 41 with his ear close to the sound emitting holes 22a.

In another specific construction, the openings 12a and the sound emitting holes 22a are provided in positions to be slightly staggered in a closed state of the both cabinets 1, 2, and the closing means comprises a projection 73 formed within an inner surface area of the body cabinet 1 in a position to face the sound emitting holes 22a with the both cabinets 1, 2 closed. The projection 73 closes the sound emitting holes 22a in the closed state of the both cabinets 1, 2, and separates from the sound emitting holes 22a with the cover cabinet 2 opened.

In the specific construction, closing the both cabinets 1, 2 brings the projection 73 on the inner surface of the body cabinet 1 into contact with the inner surface of the cover cabinet 2 to close the sound emitting holes 22a with the projection 73. opening the both cabinets 1, 2 separates the projection 73 from the sound emitting holes 22a to thereby open the sound emitting holes 22a. Consequently, the sound wave emitted from the first speaker 41 is emitted outside the cover cabinet 2 through the sound emitting holes 22a.

Further specifically, the projection 73 is formed from an elastic resin.

In the specific construction, when the both cabinets 1, 2 are closed, the sound wave emitted from the first speaker 41 is effectively absorbed due to elasticity of the projection 73 closing the sound emitting holes 22a.

In a second foldable portable terminal of the present invention, a body cabinet 1 and a cover cabinet 2 are openably/closably coupled to each other. A first speaker 41 is disposed in the cover cabinet 2. One or more sound emitting holes 22a for passing a sound wave emitted from the first speaker 41 is provided on an inner surface of the cover cabinet 2 in a position opposed to the first speaker 41. One or more openings 12a is provided on an inner surface of the body cabinet 1 in a position to be opposed to the sound emitting holes 22a with the both cabinets 1, 2 closed. A microphone 14 is disposed in the body cabinet 1 toward the openings 12a. A second speaker 42 is further disposed in the cover cabinet 2 for emitting a sound wave toward a rear surface thereof. A partition wall for partitioning a first area having the first speaker 41 disposed therein and a second area having the second speaker 42 disposed therein is formed between these two areas inside the cover cabinet 2.

With the above-described second foldable portable terminal of the present invention, the microphone 14 of the body cabinet 1 and the first speaker 41 of the cover cabinet 2 become opposed to each other through the openings 12a and the sound emitting holes 22a by closing the both cabinets 1, 2. At this time, both of the microphone 14 and the second speaker 42 face the opposite side of the rear surface of the body cabinet 1. The microphone 14 and the second speaker 42 caused to function in this state allow a user to perform speech transmission and reception with the microphone 14 and the second speaker 42 facing himself even when the both cabinets 1, 2 are closed.

At this time, vibration of the second speaker 42 can vibrate the air in the second area inside the cover cabinet 2. However, the partition wall intervenes between the both speakers 41, 42, so that the vibration from the second area toward the first area is intercepted by the partition wall. This will prevent the first speaker 41 from vibrating with the vibration of the second speaker 42.

The microphone 14 and the first speaker 41 caused to function in the opened state of the both cabinets 1, 2, allow the user to perform speech transmission and reception with his mouth close to the openings 12a and his ear close to the sound emitting holes 22a.

Specifically, the partition wall is formed by a rib 25 projecting from one of two inner walls opposed to each other inside the cover cabinet 2 toward the other inner wall, and a cushion member 43 intervening between an end of the rib 25 and the other inner wall.

In the specific construction, the vibration of the air in the second area with the vibration of the second speaker 42 is effectively absorbed due to elasticity of the cushion member 43 forming the partition wall.

In another specific construction, the cover cabinet 2 comprises an inner cabinet half 28 forming the inner surface of the cover cabinet 2 and a rear cabinet half 29 forming the rear surface of the cover cabinet 2, joined to each other, and the partition wall is formed by a first projection 26 projecting from the inner cabinet half 28, a second projection 27 projecting from the rear cabinet half 29 and being opposed to the first projection 26, and a seal member 44 intervening between the both projections 26, 27.

In the specific construction, the both projections 26, 27 pinch the seal member 44 to thereby bring the both projections 26, 27 into close contact with the seal member 44. This will prevent any gap from existing between the both projections 26, 27 and the seal member 44.

In a third foldable portable terminal of the present invention, a body cabinet 1 and a cover cabinet 2 are openably/closably coupled to each other. A microphone 63 and a first speaker 41 are disposed on inner surfaces of the body cabinet 1 and the cover cabinet 2 in positions opposed to each other with the both cabinets closed, while a second speaker 42 is disposed on a rear surface of the cover cabinet 2. The microphone 63 is rotatably disposed at an end of the body cabinet 1, and capable of facing a direction deviating from the cover cabinet 2 in a closed position with the both cabinets closed.

Specifically, it is possible to set a first call mode for causing the microphone 63 and the first speaker 41 to function with the both cabinets opened and a second call mode for causing the microphone 63 and the second speaker 42 to function with the both cabinets closed, and the microphone 63 is set in the first call mode to a first rotational posture where it faces the inner surface side of the body cabinet 1, and set in the second call mode to a second rotational posture where it faces a direction deviating from the cover cabinet 2 in a closed position.

Further specifically, the microphone 63 is incorporated, for example, in a transmission unit 6 rotatably disposed on an end of the body cabinet 1, and the transmission unit 6 comprises a sound collecting hole 62 for introducing a sound wave toward the microphone 63. The transmission unit 6 is rotationally driven by manual operation, or rotationally driven by a reciprocation drive device, between the first rotational posture and the second rotational posture.

With the above-described third foldable portable terminal of the present invention, the first call mode is set by opening the body cabinet 1 and the cover cabinet 2 to cause the microphone 63 and the first speaker 41 to function, allowing a call using the microphone 63 and the first speaker 41. When a user makes a call with the first speaker 41 held close to his ear and the microphone 63 close to his mouth, the sound is efficiently collected because the sound collecting direction of the microphone 63 is directed to the user's mouth by setting the microphone 63 to the first rotational posture.

On the other hand, the second call mode is set by closing the body cabinet 1 and the cover cabinet 2 to cause the microphone 63 and the second speaker 42 to function, allowing a hands-free call using the microphone 63 and the second speaker 42 with the portable terminal placed on a desk. The cover cabinet 2 will not prevent sound collection of the microphone 63 because the sound collecting direction of the microphone 63 is directed to a direction deviating from the cover cabinet 2 in a closed position by setting the microphone 63 to the second rotational posture.

Even when the first speaker 41 and the microphone 63 become opposed to each other by closing the body cabinet 1 and the cover cabinet 2, the sound collecting direction of the microphone 63 is directed to a direction deviating from the cover cabinet 2 in a closed position, i.e., a direction deviating from the first speaker 41 of the cover cabinet 2. Therefore, even if a sound wave from the second speaker 42 vibrates the first speaker 41 through the air in the cover cabinet 2, the sound thus generated will not be input into the microphone 63 with large sound pressure.

As described above, the foldable portable terminal of the present invention prevents or suppresses howling due to a sound wave emitted from a speaker disposed in one cabinet being transmitted to a microphone disposed in the other cabinet when the both cabinets are closed.

BEST MODE FOR CARRYING OUT THE INVENTION

Foldable portable telephones embodying the present invention will be specifically described below with reference to the drawings.

First Foldable Portable Terminal

First Embodiment

Figure 1:
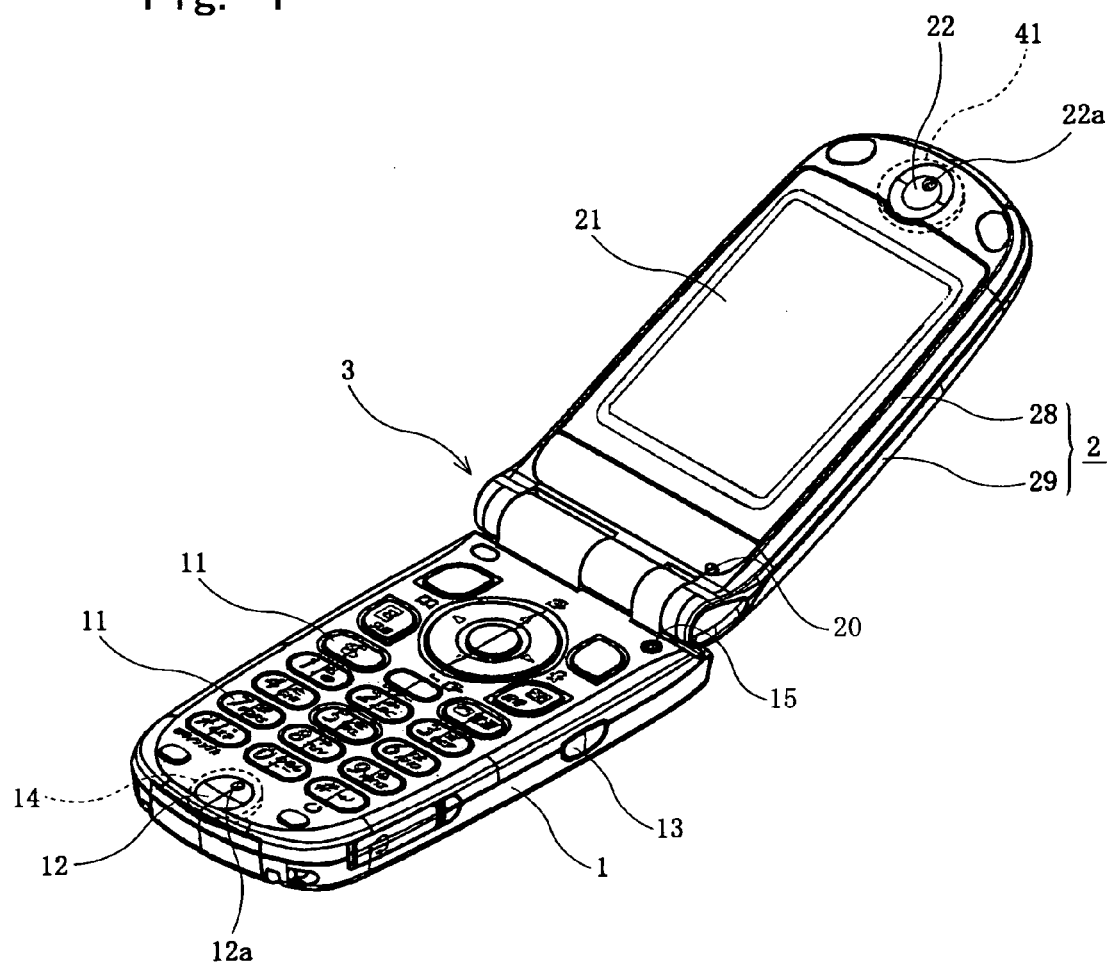
FIG. 1 is a perspective view of a foldable portable telephone in an open state in a first embodiment of a first foldable portable terminal or a first embodiment and second embodiment of a second foldable portable terminal of the present invention.
Figure 2:
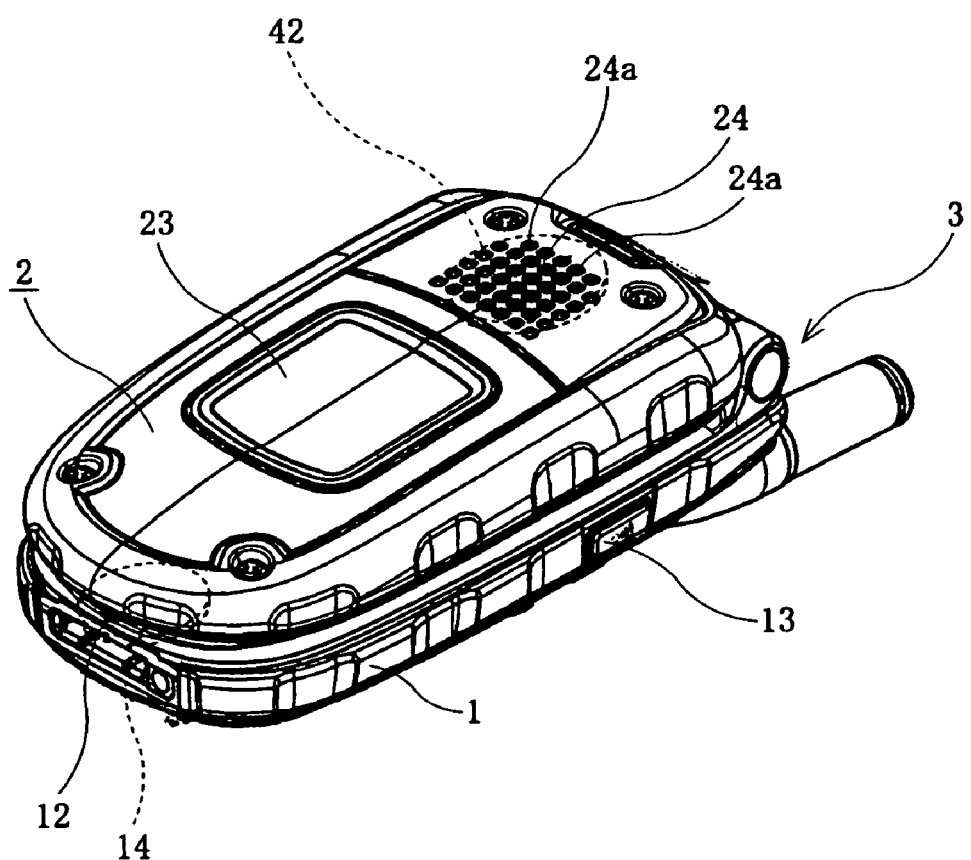
FIG. 2 is a perspective view of the foldable portable telephone in a closed state.

As shown in FIG. 1 and FIG. 2, a foldable portable telephone of the present embodiment includes a body cabinet 1 coupled to a cover cabinet 2 through a hinge mechanism 3. The body cabinet 1 and the cover cabinet 2 are foldable with an inner surface of the body cabinet 1 and an inner surface of the cover cabinet 2 opposed to each other. The cover cabinet 2 includes an inner cabinet half 28 joined to a rear cabinet half 29. The body cabinet 1 also has a construction similar to that of the cover cabinet 2.

As shown in FIG. 1, a plurality of manual keys 11 are disposed on the inner surface of the body cabinet 1. A transmitter 12 is recessed below the manual keys 11. The transmitter 12 is formed with an opening 12a penetrating inwardly from the inner surface side of the body cabinet 1. A microphone 14 having a sound collecting surface facing the opening 12a is disposed inside the body cabinet 1. A cabinet open/close detection switch 15 is also disposed at an end by the hinge mechanism 3. A side key 13 is disposed on a side surface of the body cabinet 1.

A main display 21 is disposed on the inner surface of the cover cabinet 2. A receiver 22 is disposed above the main display 21 in a position to be opposed to the transmitter 12 with the both cabinets 1, 2 closed. A first speaker 41 having a sound emitting surface facing the receiver 22 is disposed inside the cover cabinet 2. The receiver 22 is provided with a plurality of sound emitting holes 22a for passing a sound wave from the first speaker 41. Below the main display 21 projects a press pin 20 for pressing the cabinet open/close detection switch 15 by closing the both cabinets 1, 2.

As shown in FIG. 2, the cover cabinet 2 has a rear surface provided with a sub display 23, and a sound emitter 24 disposed between the sub display 23 and the hinge mechanism 3. A second speaker 42 having a sound emitting surface facing the sound emitter 24 is disposed inside the cover cabinet 2.

Figure 3:
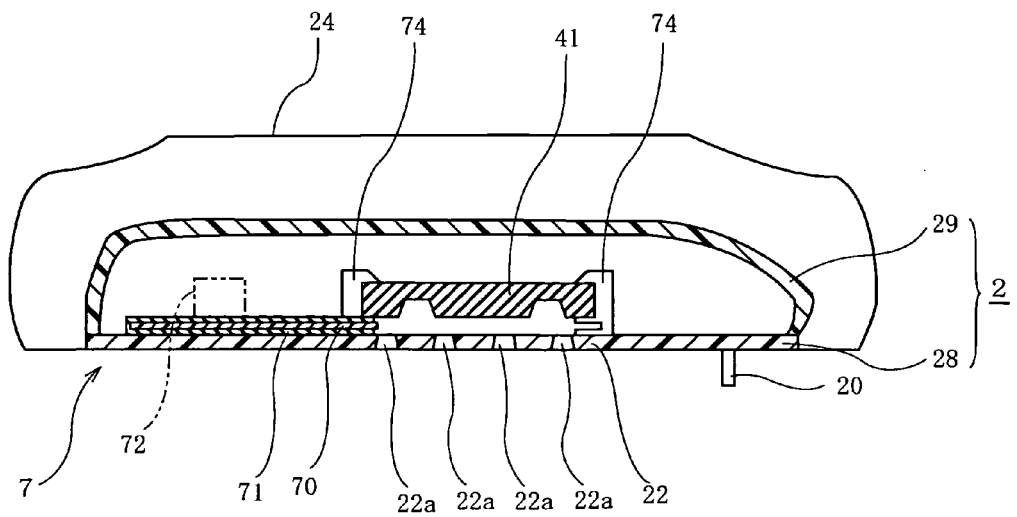
FIG. 3 is a partially broken front view of-the foldable portable telephone in the open state in the first embodiment of the first foldable portable terminal of the present invention.

As shown in FIG. 3, the first speaker 41 disposed inside the cover cabinet 2 is held and fixed by a pair of speaker holding members 74, 74. Disposed by one speaker holding member 74 is a shutter mechanism 7 for opening/closing the plurality of sound emitting holes 22a in response to opening/closing of the both cabinets 1, 2.

The shutter mechanism 7 includes a band-like shutter member 70 supported slidably along a reverse surface of the inner cabinet half 28, a shutter containing room 71 for containing the shutter member 70, and a drive mechanism 72 for reciprocatingly driving the shutter member 70 in response to opening/closing of the both cabinets 1, 2. The shutter member 70 is slidable along the reverse surface of the inner cabinet half 28 with operation of the drive mechanism 72 between a contained position of being contained in the shutter containing room 71 as shown in FIG. 3 and a closing position of closing the plurality of sound emitting holes 22a by entering between opposed faces of the sound emitting surface of the first speaker 41 and the plurality of sound emitting holes 22a as shown in FIG. 4.

When the above-described foldable portable telephone of the present embodiment is carried in a pocket or a bag, the both cabinets 1, 2 are folded from an opened state of the both cabinets 1, 2 as shown in FIG. 1 to close the both cabinets 1, 2 as shown in FIG. 2. This hides the main display 21 and the plurality of manual keys 11 shown in FIG. 1 inside the both cabinets 1, 2. Under these circumstances, there is no possibility that the main display 21 may be damaged by an action of an external force, nor is the possibility that the plurality of manual keys 11 may be pressed by an action of an external force to cause misoperation.

Figure 4:
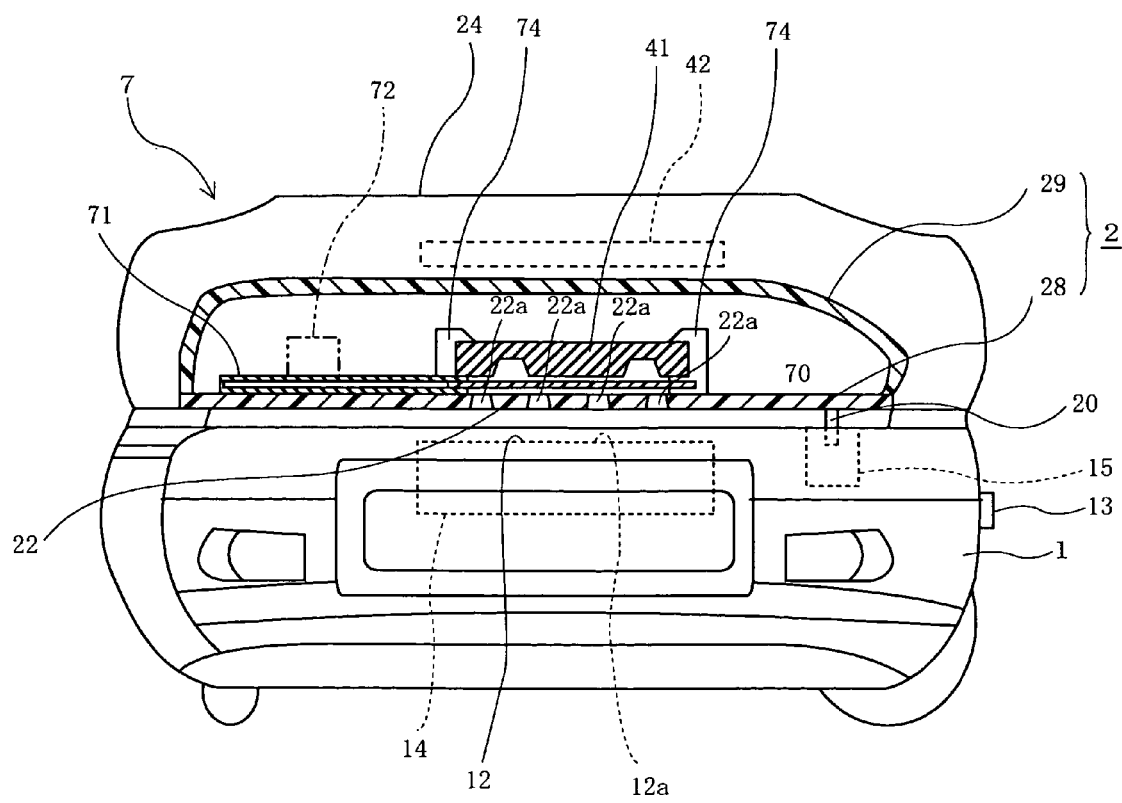
FIG. 4 is a partially broken front view of the foldable portable telephone in the closed state.

At this time, as shown in FIG. 4, the cabinet open/close detection switch 15 is pressed by the press pin 20 to turn to an on state, feeding a signal for notifying the on state to a control circuit (not shown) incorporated in the body cabinet 1. The control circuit detects that the both cabinets 1, 2 are closed based on the signal, and feeds the detection signal to the drive mechanism 72 of the shutter mechanism 7. In response to the detection signal, the drive mechanism 72 slides the shutter member 70 from the contained position shown in FIG. 3 to the closing position shown in FIG. 4. The plurality of sound emitting holes 22a are thereby closed with the shutter member 70, which intercepts a path for emitting a sound wave emitted from the first speaker 41 outside the cover cabinet 2.

Depressing the side key 13 in this state to set a hands-free mode allows a user to perform speech transmission and reception with the foldable portable telephone placed on a desk without held by the user's hand.

At this time, the control circuit causes the microphone 14 and the second speaker 42 to function in response to the signal from the cabinet open/close detection switch 15 and the hands-free mode being set. Because the transmitter 12 is recessed on the inner surface of the body cabinet 1, the opening 12a of the transmitter 12 is not closed by the inner surface of the cover cabinet 2 even when the both cabinets 1, 2 are closed.

When the both cabinets 1, 2 are placed on a desk in this state with a rear surface of the body cabinet 1 in contact with a surface of the desk, the sound emitter 24 and the transmitter 12 thereby become opposed to the user. Speech transmission and reception are performed by the other party's voice being emitted from the sound emitter 24, and the user's voice being collected by the transmitter 12.

At this time, vibration of the second speaker 42 can be transmitted to the first speaker 41 through the cover cabinet 2 and air inside the cover cabinet 2 to thereby vibrate the first speaker 41. This can cause the first speaker 41 to emit a sound wave having a waveform approximated to that of the sound wave emitted from the second speaker 42. However, the sound wave emitted from the first speaker 41 is only slightly emitted outside the cover cabinet 2 because the plurality of sound emitting holes 22a are closed by the shutter member 70. Further, the sound wave emitted outside the cover cabinet 2 will not be transmitted to the microphone 14 because the sound wave attenuates in the process of passing through the opening 12a of the transmitter 12 to reach inside the body cabinet 1.

Therefore, howling through the first speaker 41 will not occur between the second speaker 42 and the microphone 14, so that there is no possibility of giving the other party displeasure.

With the above-described foldable portable telephone of the present embodiment, speech transmission and reception, message transmission and reception and creation of a transmitting message can be performed with the both cabinets 1, 2 opened as shown in FIG. 1.

opening the both cabinets 1, 2 exposes the main display 21 and the receiver 22 on the inner surface of the cover cabinet 2, and at the same time exposes the manual keys 11 and the transmitter 12 on the inner surface of the body cabinet 1. At this time, the cabinet open/close detection switch 15 is released from the press by the press pin 20 to turn to an off state. Accordingly, the control circuit causes the microphone 14 and the first speaker 41 to function.

The control circuit also brings the drive mechanism 72 of the shutter mechanism 7 into operation to thereby slide the shutter member 70 from the closing position shown in FIG. 4 to the contained position shown in FIG. 3. Consequently, the plurality of sound emitting holes 22a are opened, so that the sound wave emitted from the first speaker 41 is emitted outside the cover cabinet 2 through the plurality of sound emitting holes 22a.

Therefore, when a call arrives, the user can perform an off-hook operation with a manual key 11 to thereby allow the call, and answer the incoming call with the receiver 22 close to his ear and the transmitter 12 close to his mouth.

When a message is received, contents of the received message are displayed on a screen of the main display 21 by manipulation of a manual key 11, so that the contents can be checked. When a message is created, texts created by the user are displayed on the screen of the main display 21 by manipulation of a manual key 11.

According to the above-described foldable portable telephone of the present embodiment, the plurality of sound emitting holes 22a of the receiver 22 open/close in response to opening/closing of the both cabinets 1, 2. Even when the second speaker 42 and the microphone 14 are caused to function simultaneously with the both cabinets 1, 2 closed, a howling phenomenon will not occur between the second speaker 42 and the microphone 14, so that hands-free speech transmission and reception are performed in good call condition.

Second Embodiment

A foldable portable telephone of the present embodiment shown in FIG. 5 and FIG. 6 differs from that of the above-described first embodiment in a structure of closing the sound emitting holes 22a, but is the same as that of the first embodiment in other structures, and therefore will be described as to the structure of closing the sound emitting holes 22a, and not described as to the other structures with the same reference characters.

Figure 5:
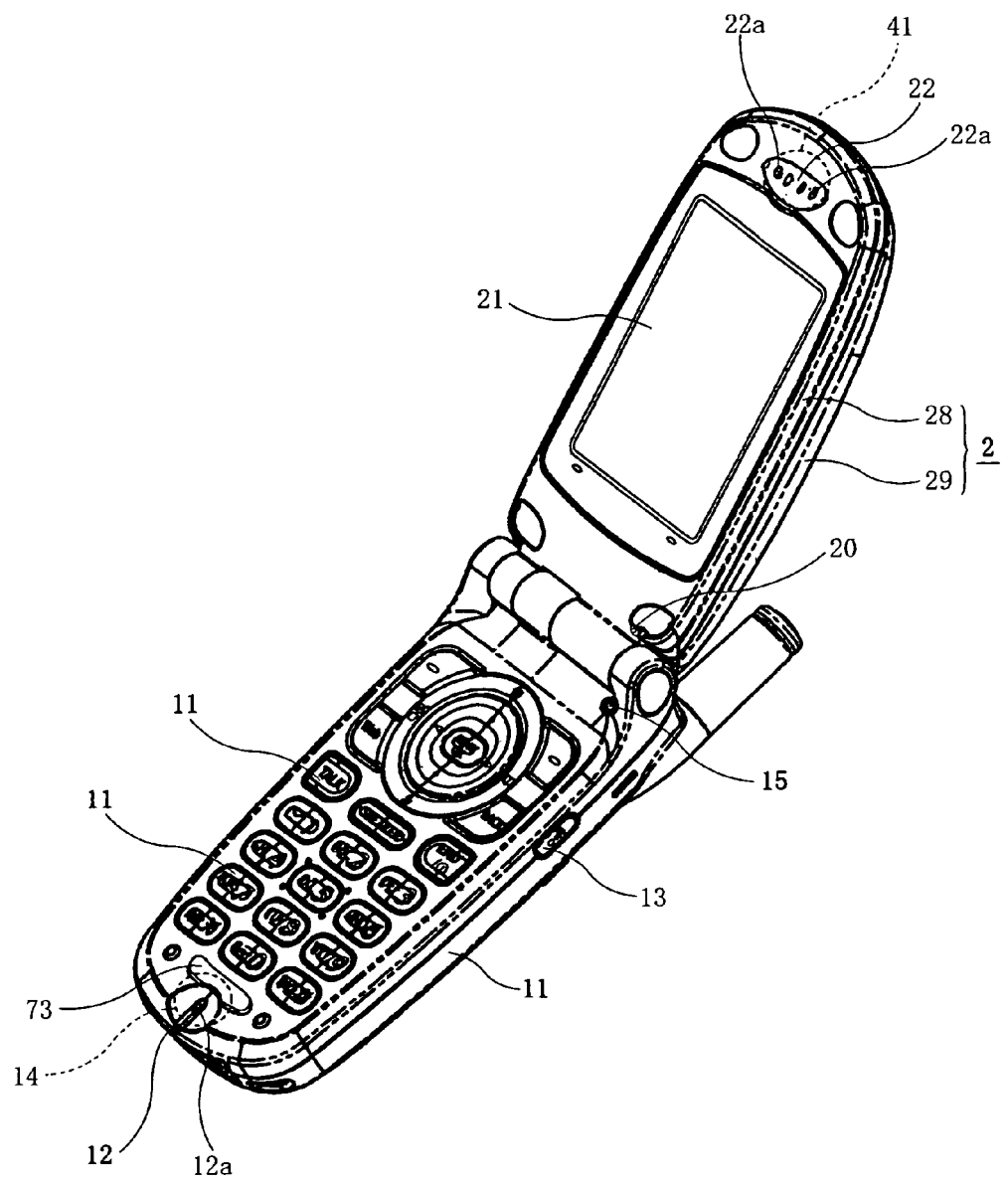
FIG. 5 is a perspective view of a foldable portable telephone in an open state in a second embodiment of the first foldable portable terminal of the present invention.
Figure 6:
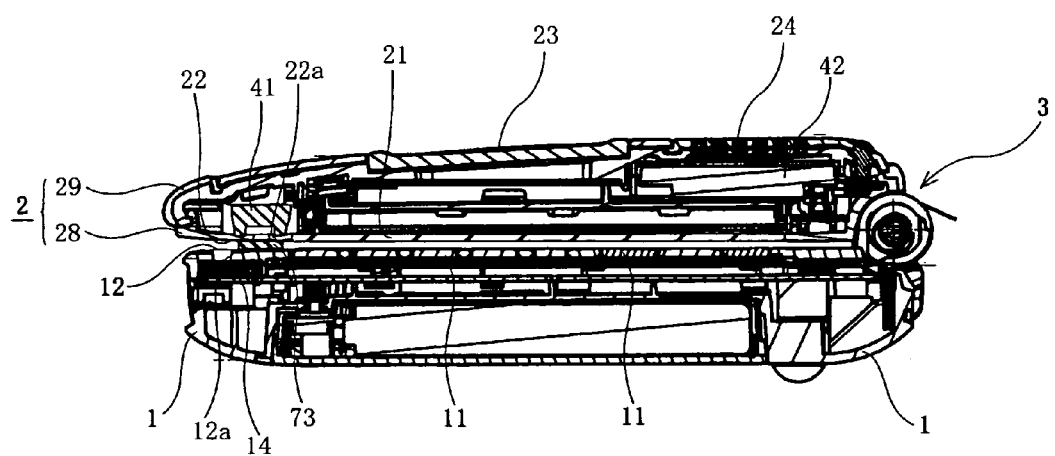
FIG. 6 is a sectional view of the foldable portable telephone in a closed state.

As shown in FIG. 5, the foldable portable telephone of the present embodiment has the receiver 22 of the cover cabinet 2 disposed closer to the main display 21 than in the above-described first embodiment, so that, as shown in FIG. 6, the receiver 22 and the transmitter 12 of the body cabinet 1 are staggered in a coupling direction of the both cabinets 1, 2 when the both cabinets 1, 2 are closed.

A flat plate-like projection 73 made of an elastic resin is disposed on the inner surface of the body cabinet 1 in a position to be opposed to the receiver 22 of the cover cabinet 2 with the both cabinets 1, 2 closed.

With the above-described foldable portable telephone of the present embodiment, the projection 73 on the inner surface of the body cabinet 1 is brought into contact with the inner surface of the cover cabinet 2 by closing the both cabinets 1, 2 to close the sound emitting holes 22a with the projection 73, which intercepts a path for emitting a sound wave emitted from the first speaker 41 outside the cover cabinet 2.

If the hands-free mode is set in this state, the control circuit causes the microphone 14 and the second speaker 42 to function in response to a signal for notifying an on state of the cabinet open/close detection switch 15 and the hands-free mode being set. The other party's voice is thereby emitted from the second speaker 42 of the sound emitter 24 on the rear surface of the cover cabinet 2, while the user's voice is collected by the microphone 14 of the transmitter 12.

At this time, the first speaker 41 also can vibrate with vibration of the second speaker 42 to thereby emit a sound wave from the first speaker 41. However, the sound wave from the first speaker 41 is effectively absorbed due to elasticity of the projection 73 made of an elastic resin, and hardly emitted outside the cover cabinet 2 because the plurality of sound emitting holes 22a for passing the sound wave are closed by the projection 73. Consequently, only an extremely slight sound wave is emitted outside the cover cabinet 2, so that the sound wave will not be transmitted to the microphone 14 through the opening 12a of the body cabinet 1.

The projection 73 of the body cabinet 1 is separated from the sound emitting holes 22a of the cover cabinet 2 by opening the both cabinets 1, 2 to thereby open the sound emitting holes 22a. At this time, the cabinet open/close detection switch 15 is released from the press by the press pin 20 to turn to an off state. Accordingly, the control circuit causes the microphone 14 and the first speaker 41 to function.

Therefore, when a call arrives, the user can perform an off-hook operation with a manual key 11 to thereby allow the call, and answer the incoming call with the receiver 22 close to his ear and the transmitter 12 close to his mouth.

According to the above-described foldable portable telephone of the present embodiment, the plurality of sound emitting holes 22a of the receiver 22 can be opened/closed in response to opening/closing of the both cabinets 1, 2 with a simple construction of providing the projection 73 made of an elastic resin on the inner surface of the body cabinet 1. This will prevent howling through the first speaker 41 from occurring between the second speaker 42 and the microphone 14 even when the second speaker 42 and the microphone 14 are caused to function with the both cabinets 1, 2 closed.

Second Foldable Portable Terminal
First Embodiment

A foldable portable telephone of the present embodiment has a construction similar to that of the first embodiment of the above-described first foldable portable terminal shown in FIG. 1 and FIG. 2. A body cabinet 1 and a cover cabinet 2 are openably/closably coupled to each other through a hinge mechanism 3. The cover cabinet 2 includes an inner cabinet half 28 joined to a rear cabinet half 29.

Figure 7:
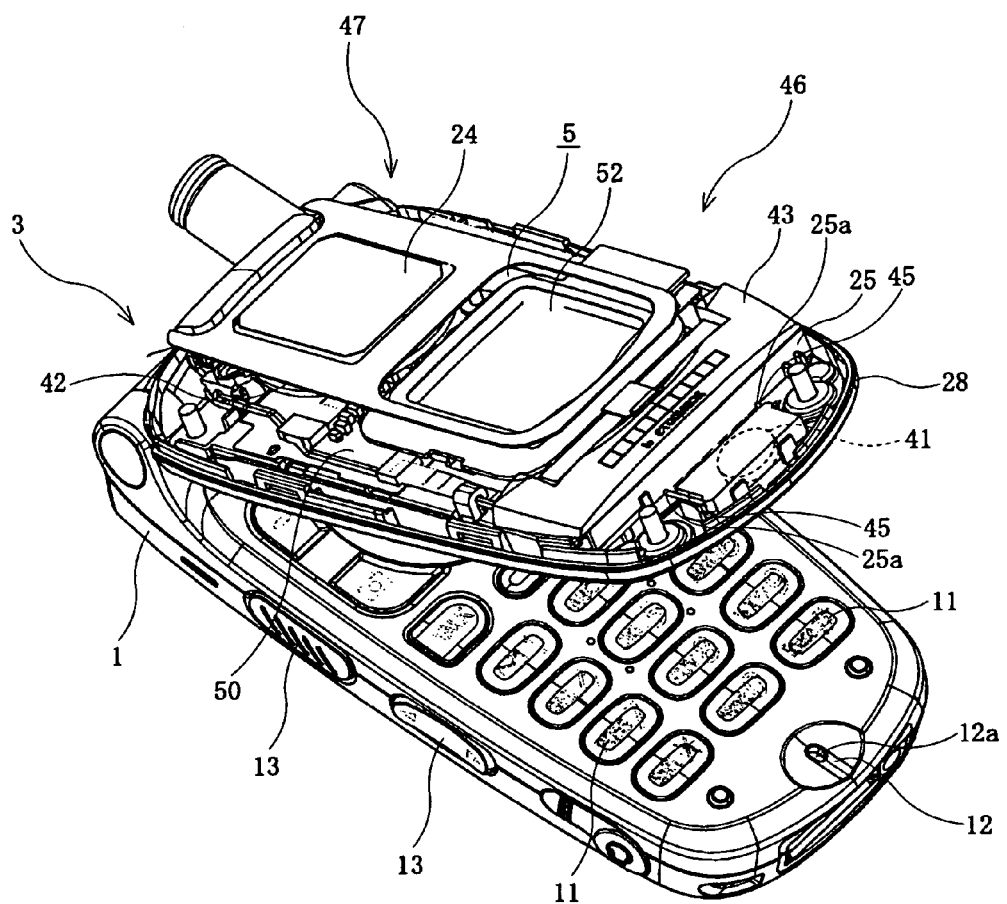
FIG. 7 is a perspective view showing an exposed interior of a cover cabinet of the foldable portable telephone in the first embodiment of the second foldable portable terminal of the present invention.
Figure 8:
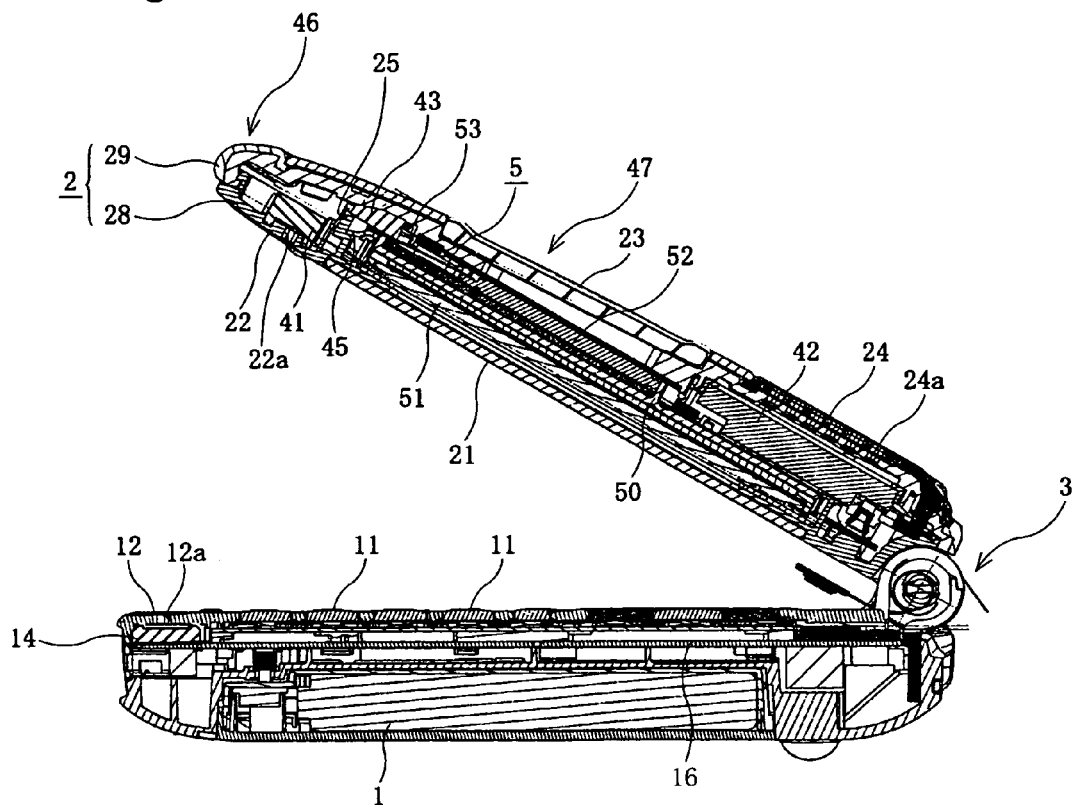
FIG. 8 is a sectional view of the foldable portable telephone.
Figure 9:
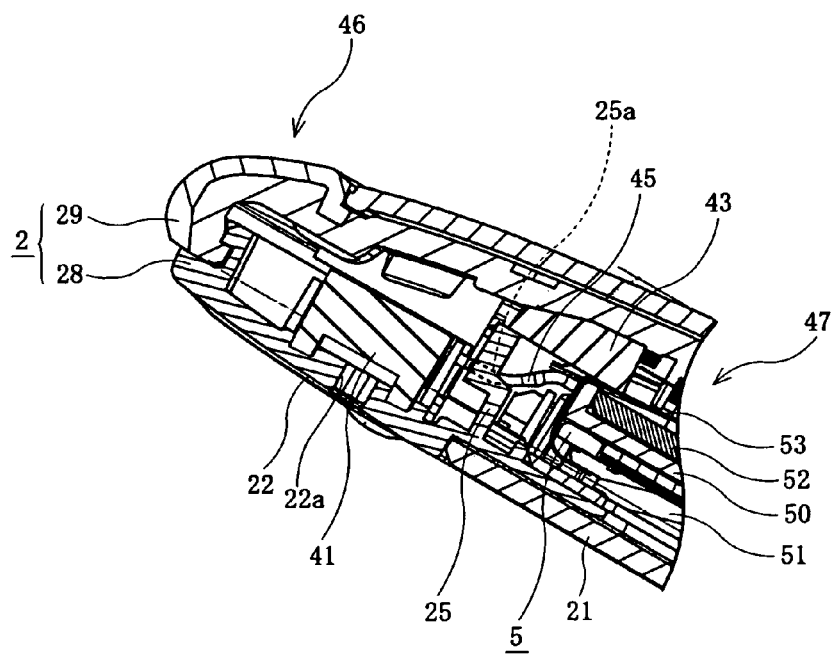
FIG. 9 is an enlarged fragmentary sectional view of the foldable portable telephone.

As shown in FIG. 7 to FIG. 9, a display assembly 5 is disposed between the inner cabinet half 28 and the rear cabinet half 29 forming the cover cabinet 2. A first speaker 41 is disposed above the display assembly 5 toward a receiver 22 on an inner surface of the cover cabinet 2.

As shown in FIG. 8, the display assembly 5 includes a main liquid crystal display 51 placed on an inner surface of a metal frame 50 and a sub liquid crystal display 52 placed on a rear surface of the frame 50. The main liquid crystal display 51 is opposed to a main screen 21 disposed on the inner cabinet half 28, while the sub liquid crystal display 52 is opposed to a sub screen 23 disposed on the rear cabinet half 29. A second speaker 42 is disposed below the sub liquid crystal display 52 toward a sound emitter 24 on a rear surface of the cover cabinet 2.

As shown in FIG. 9, a flexible lead 53 led from the sub liquid crystal display 52 extends between the frame 50 and the inner cabinet half 28, covering an upper end of the display assembly 5, and has an end thereof connected to the main liquid crystal display 51. Disposed on the upper end of the display assembly 5 is, as shown in FIG. 7 and FIG. 9, a cushion member 43 made of urethane, which is in contact with the flexible lead 53 to cover the flexible lead 53 and in contact with an inner wall of the rear cabinet half 29.

As shown in FIG. 9, from the inner cabinet half 28 toward the rear cabinet half 29 projects a rib 25 intervening between the display assembly 5 and the first speaker 41 and extending in a direction intersecting both sides of the cover cabinet 2. The cushion member 43 is pinched and held by an end of the rib 25 and the inner wall of the rear cabinet half 29. A pair of signal lines 45, 45 extending from the first speaker 41 penetrate a pair of through holes 25a, 25a formed in the rib 25 to extend to a substrate assembly 16 inside the body cabinet 1 shown in FIG. 8. The through holes 25a shown in FIG. 9 have an inner diameter approximately same as an outer diameter of the signal lines 45 to prevent any gap from existing between the through holes 25a and the signal lines 45.

In this way, a partition wall including the rib 25 and the cushion member 43 is formed inside the cover cabinet 2. The interior of the cover cabinet 2 is divided by the partition wall into a first containing section 46 having the first speaker 41 disposed therein and a second containing section 47 having disposed therein the display assembly 5 including the second speaker 42.

With the above-described foldable portable telephone of the present embodiment, speech transmission and reception, message transmission and reception and creation of a transmitting message can be performed with the both cabinets 1, 2 opened as shown in FIG. 1.

Opening the both cabinets 1, 2 exposes the main screen 21 and the receiver 22 on the inner surface of the cover cabinet 2, and at the same time exposes the manual keys 11 and the transmitter 12 on the inner surface of the body cabinet 1. At this time, the cabinet open/close switch 15 detects the open state of the both cabinets 1, 2 to feed a detection signal based on the detection to a control circuit (not shown). The control circuit causes the microphone 14 and the first speaker 41 to function in response to the detection signal.

Consequently, when a call arrives, the main screen 21 displays the other party's telephone number and name. Accordingly, the user can perform an off-hook operation with a manual key 11 to allow the call, and answer the incoming call with the receiver 22 close to his ear and the transmitter 12 close to his mouth.

When a message is received, contents of the received message are displayed on the main screen 21 by manipulation of a manual key 11, so that the contents can be checked. When a message is created, texts created by the user are displayed on the main screen 21 by manipulation of a manual key 11.

When the above-described foldable portable telephone of the present embodiment is carried in a pocket or a bag, the both cabinets 1, 2 are folded from an opened state of the both cabinets 1, 2 as shown in FIG. 1 to close the both cabinets 1, 2 as shown in FIG. 2. This hides the main screen 21 and the plurality of manual keys 11 shown in FIG. 1 inside the both cabinets 1, 2. Under these circumstances, there is no possibility that the main screen 21 may be damaged by an action of an external force, nor is the possibility that the plurality of manual keys 11 may be pressed by an action of an external force to cause misoperation.

As shown in FIG. 7, the opening 12a of the transmitter 12 is not closed by the inner surface of the cover cabinet 2 because the transmitter 12 is recessed.

Depressing the side key 13 in this state to set a hands-free mode allows the user to perform speech transmission and reception with the foldable portable telephone in a closed state placed on a desk without held by the user's hand. When the both cabinets 1, 2 are placed on a desk with a rear surface of the body cabinet 1 in contact with a surface of the desk, the sound emitter 24 and the transmitter 12 thereby become opposed to the user.

At this time, the cabinet open/close detection switch 15 detects the closed state of the both cabinets 1, 2 to feed a detection signal based on the detection to the control circuit. The control circuit causes the microphone 14 and the second speaker 42 to function in response to the detection signal and the hands-free mode being set.

Consequently, when a call is received, the other party's voice emitted from the second speaker 42 shown in FIG. 2 is emitted toward the user through the plurality of sound emitting holes 24a of the sound emitter 24, while the user's voice through the opening 12a of the transmitter 12 is transmitted to the microphone 14 and sent to the other party, so that speech transmission and reception are performed.

At this time, vibration of the second speaker 42 can vibrate the air inside the second containing section 47 of the cover cabinet 2 shown in FIG. 8. However, the vibration from the second containing section 47 toward the first containing section 46 is reflected by the rib 25 forming the partition wall, or absorbed by elasticity of the cushion member 43. This will prevent the vibration of the air inside the second containing section 47 from reaching the first speaker 41 in the first containing section 46.

As described above, according to the above-described foldable portable telephone of the present embodiment, a loop of an acoustic transmission path through the first speaker 41 will not be formed between the second speaker 42 and the microphone 14 because the first speaker 41 will not vibrate with the vibration of the second speaker 42. Therefore, howling will not occur, so that hands-free speech transmission and reception are possible in good call condition.

Second Embodiment

A foldable portable telephone of the present embodiment shown in FIG. 10 to FIG. 12 differs from that of the above-described first embodiment in a structure of the partition wall, but is the same as that of the first embodiment in other structures, and therefore will be described as to the structure of the partition wall, and not described as to the other structures with the same reference characters.

Figure 10:
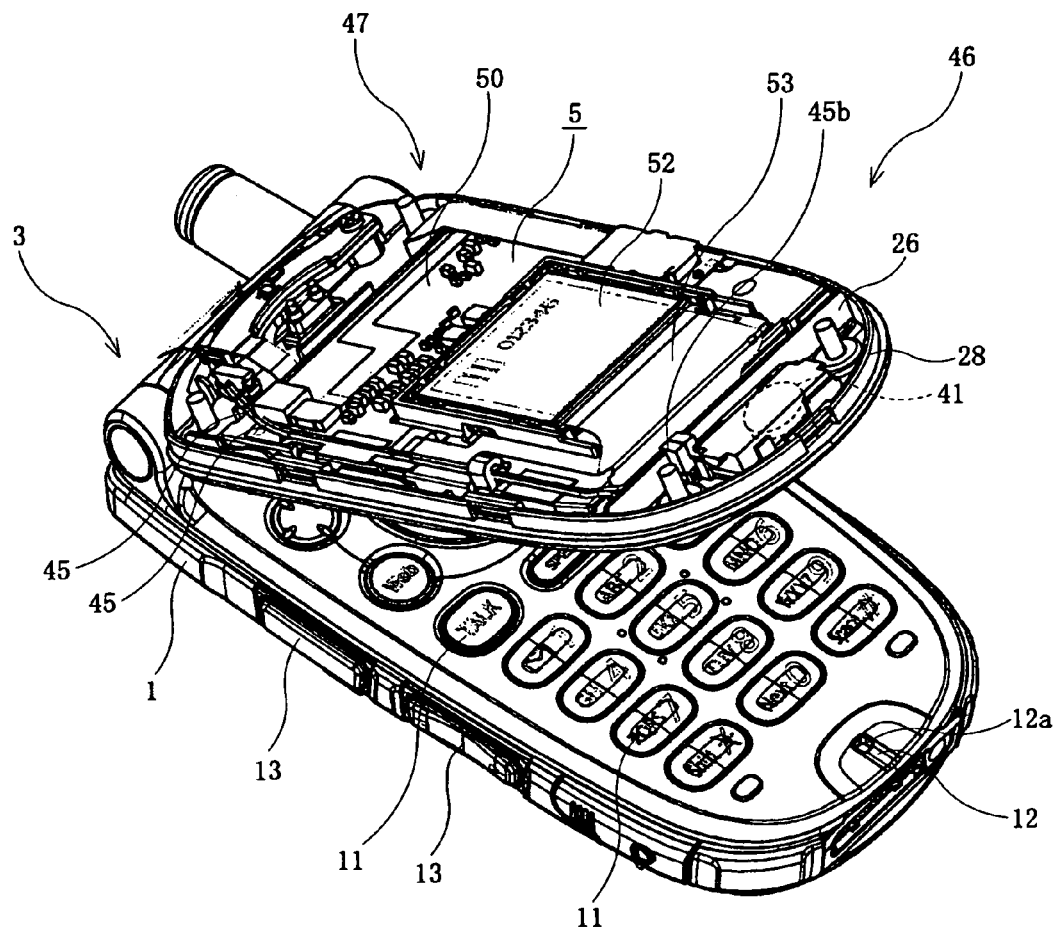
FIG. 10 is a perspective view showing an exposed interior of a cover cabinet of the foldable portable telephone in the second embodiment of the second foldable portable terminal of the present invention.

With the foldable portable telephone of the present embodiment, as shown in FIG. 10, from the inner cabinet half 28 of the cover cabinet 2 toward the rear cabinet half 29 projects a flat plate-like first projection 26 intervening between the display assembly 5 and the first speaker 41 and extending in a direction intersecting both sides of the cover cabinet 2. As shown in FIG. 12, a second projection 27 extending in a direction intersecting both sides of the cover cabinet 2 projects from the rear cabinet half 29 toward the inner cabinet half 28 in a position opposed to the first projection 26. The second projection 27 is formed by a pair of protrusions 27a, 27a. One protrusion 27a is positioned slightly closer to the first speaker 41 than the first projection 26 is, while the other protrusion 27a is positioned slightly closer to the display assembly 5 than the first projection 26 is.

A seal member 44 covering an end of the first projection 26 intervenes between the both projections 26, 27. Due to the both cabinet halves 28, 29 being joined to each other, a middle portion of the seal member 44 is pressed toward the rear cabinet half 29 by the first projection 26, while both end portions of the seal member 44 are pressed toward the inner cabinet half 28 by the pair of protrusions 27a, 27a of the second projection 27. Consequently, the seal member 44 is pinched by the both projections 26, 27. The both projections 26, 27 and the seal member 44 are thereby brought into close contact with each other to prevent any gap from existing between the both projections 26, 27 and the seal member 44.

Figure 11:
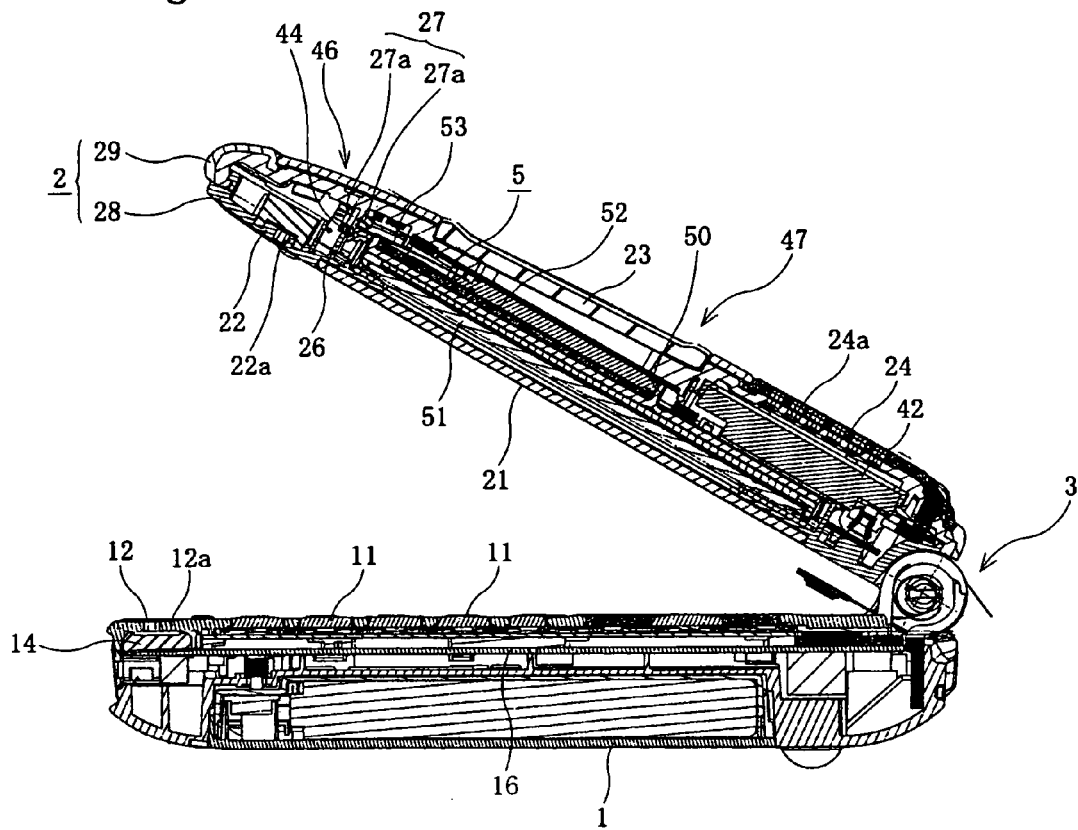
FIG. 11 is a sectional view of the foldable portable telephone.
Figure 12:
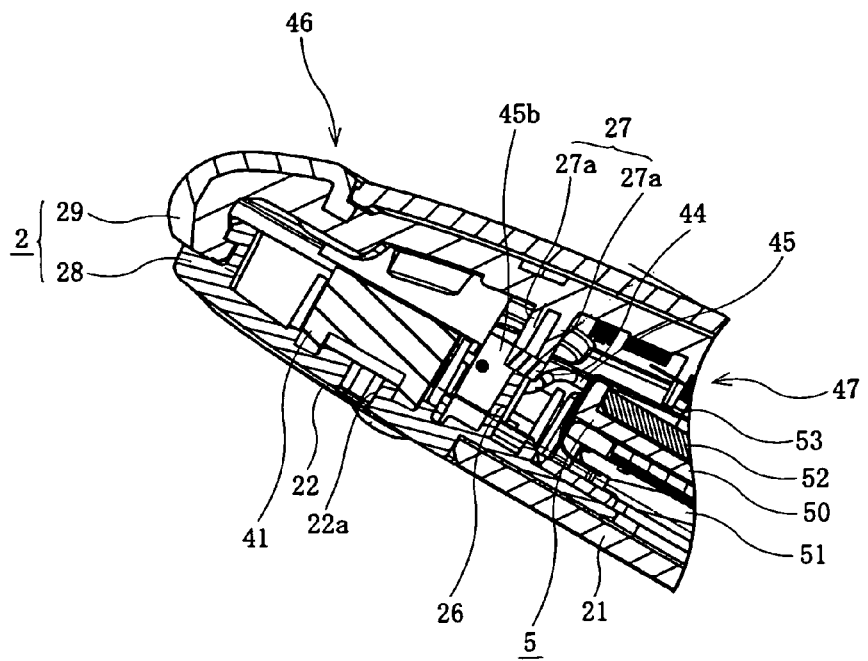
FIG. 12 is an enlarged fragmentary sectional view of the foldable portable telephone.

As shown in FIG. 10, the pair of signal lines 45, 45 extending from the first speaker 41 penetrate a box 45b formed penetrating the first projection 26 to extend to the substrate assembly 16 inside the body cabinet 1 shown in FIG. 11.

In this way, a partition wall including the both projections 26, 27 and the seal member 44 is formed inside the cover cabinet 2. The interior of the cover cabinet 2 is divided by the partition wall into the first containing section 46 containing the first speaker 41 and the second containing section 47 containing the display assembly 5 including the second speaker 42.

With the above-described foldable portable telephone of the present embodiment, because the partition wall partitioning the both containing sections 46, 47 without any gap is formed between the both speakers 41, 42, the vibration from the second speaker 42 will not be transmitted to the first containing section 46 even when the second speaker 42 and the microphone 14 are caused to function with the both cabinets 1, 2 closed. Therefore, a loop of an acoustic transmission path through the first speaker 41 will not be formed between the second speaker 42 and the microphone 14, which will prevent howling from occurring.

Third Foldable Portable Terminal

Figure 13:
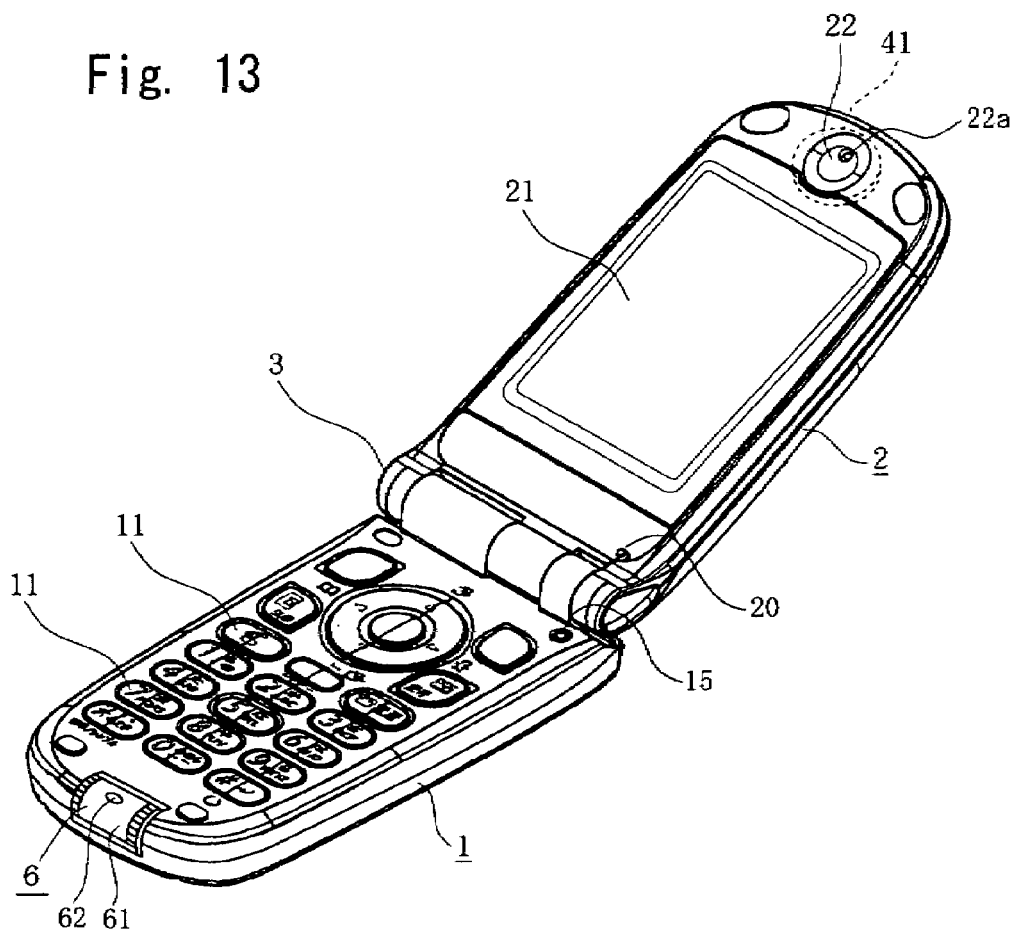
FIG. 13 is a perspective view of a third foldable portable telephone of the present invention in an open state.
Figure 14:
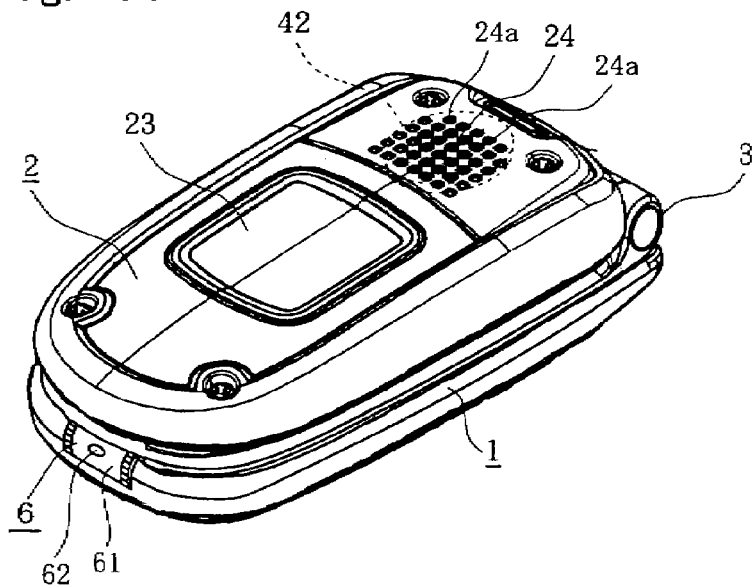
FIG. 14 is a perspective view of the foldable portable telephone in a closed state.

As shown in FIG. 13 and FIG. 14, a foldable portable telephone of the present embodiment includes a body cabinet 1 coupled to a cover cabinet 2 through a hinge mechanism 3. The both cabinets 1, 2 are foldable with an inner surface of the body cabinet 1 and an inner surface of the cover cabinet 2 opposed to each other.

As shown in FIG. 13, the body cabinet 1 has a plurality of manual keys 11 disposed on the inner surface thereof, and a transmission unit 6 provided with a sound collecting hole 62, attached to an end separate from the hinge mechanism 3.

On the other hand, the cover cabinet 2 has a main display 21 disposed on the inner surface thereof, and a receiver 22 provided with a sound emitting hole 22a disposed at an end separate from the hinge mechanism 3. As shown in FIG. 14, the cover cabinet 2 has a rear surface provided with a sub display 23, and a sound emitter 24 provided with a plurality of sound emitting holes 24a, disposed between the sub display 23 and the hinge mechanism 3.

Figure 16:
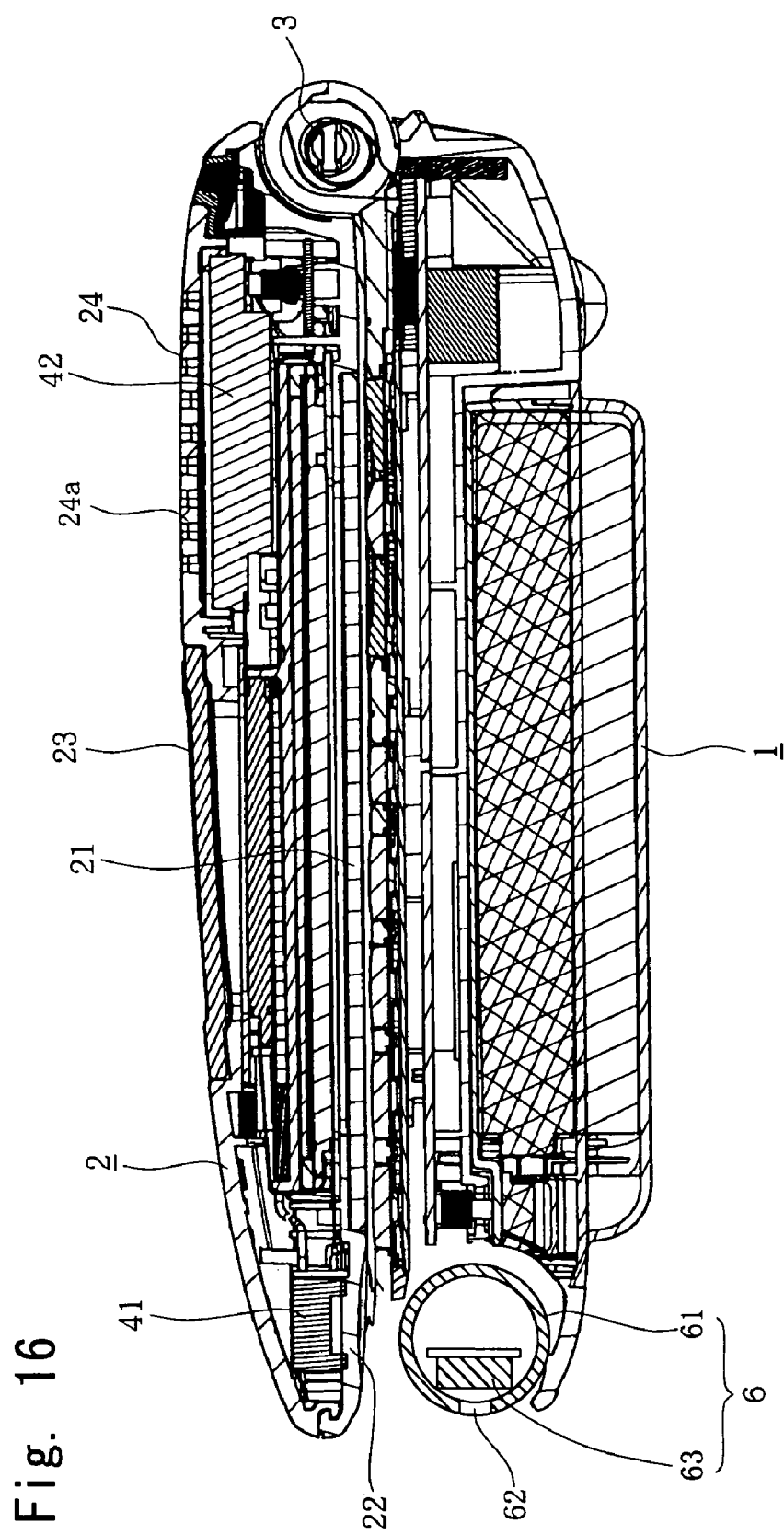
FIG. 16 is an enlarged sectional view of the foldable portable telephone in a closed state.
Figure 17:
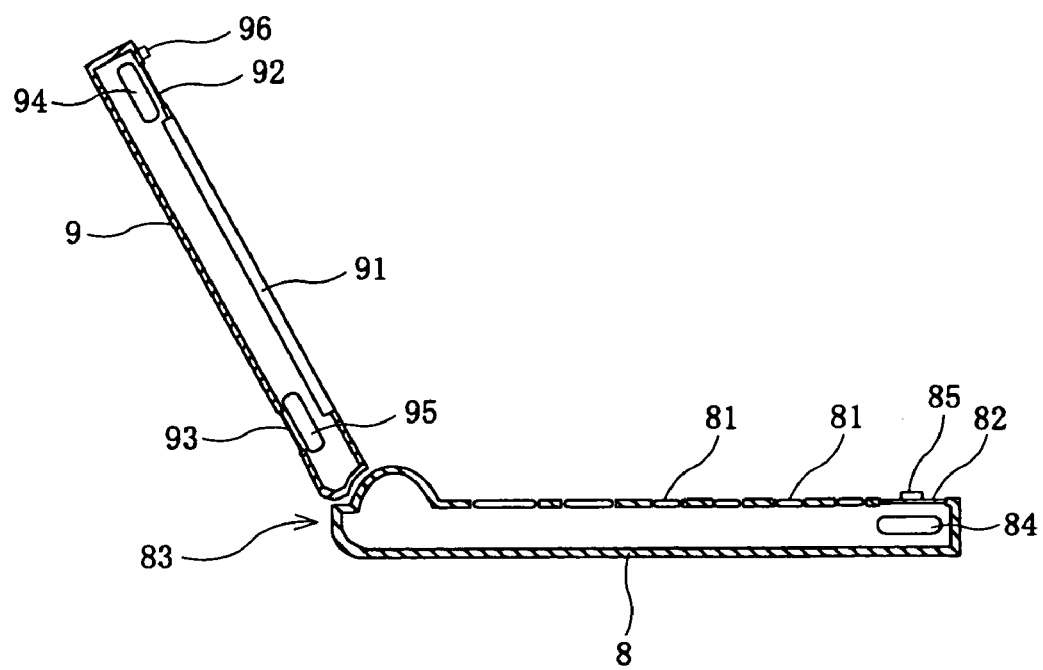
FIG. 17 is a sectional view of a conventional foldable portable telephone in an open state.

As shown in FIG. 16, inside the cover cabinet 2, a first speaker 41 is disposed toward the receiver 22, while a second speaker 42 is disposed toward the sound emitter 24.

The transmission unit 6 includes a microphone 63 contained inside a cylindrical tube piece 61. The tube piece 61 is supported rotatably relative to the body cabinet 1 on an axis parallel with a rotation axis of the hinge mechanism 3. The tube piece 61 is provided with a sound collecting hole 62 for introducing a sound wave toward the microphone 63 in a position opposed to a sound receiving surface (not shown) of the microphone 63.

Figure 15:
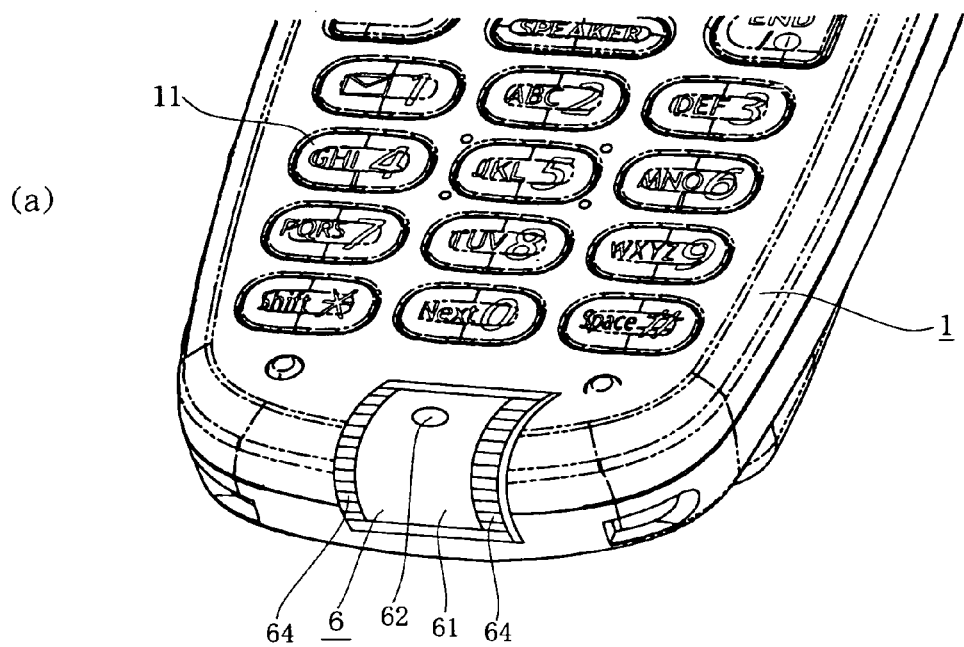
FIG. 15 is a perspective view showing a transmission unit of the foldable portable telephone in a first rotational posture and a second rotational posture.
Figure 15:
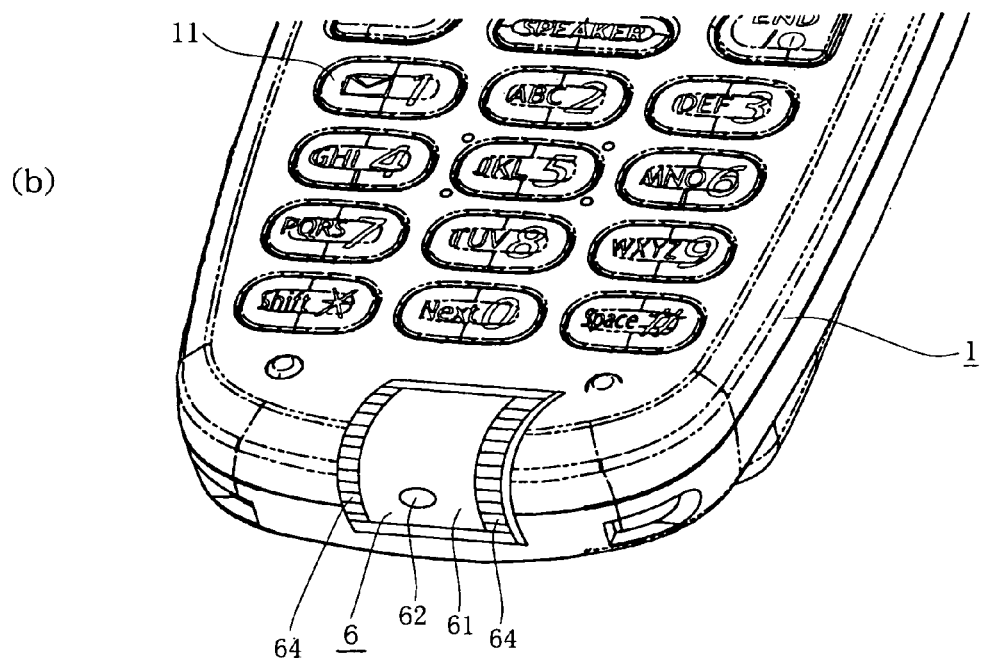

The transmission unit 6 is rotatable approximately 90 degrees between a first rotational posture where the sound collecting hole 62 faces the inner surface side of the body cabinet 1 as shown in FIG. 15(a) and a second rotational posture where the sound collecting hole 62 faces the end surface side of the body cabinet 1 as shown in FIG. 15(b). The tube piece 61 of the transmission unit 6 has saw-tooth projections and depressions carved on both sides of the outer peripheral surface to form manipulation portions 64, 64 for rotationally manipulating the transmission unit 6.

With the above-described foldable portable telephone of the present embodiment, a first call mode is set by opening the body cabinet 1 and the cover cabinet 2 as shown in FIG. 13 to cause the transmission unit 6 and the first speaker 41 to function, allowing a call using the transmission unit 6 and the first speaker 41. When a user makes a call with the first speaker 41 held close to his ear and the transmission unit 6 close to his mouth, the sound is efficiently collected because the sound collecting hole 62 of the transmission unit 6 is directed to the user's mouth by setting the transmission unit 6 to the illustrated first rotational posture.

On the other hand, a second call mode is set by closing the body cabinet 1 and the cover cabinet 2 as shown in FIG. 14 to cause the transmission unit 6 and the second speaker 42 to function, allowing a hands-free call using the transmission unit 6 and the second speaker 42 with the portable phone placed on a desk. The cover cabinet 2 will not prevent sound collection of the transmission unit 6 because the sound collecting hole 62 of the transmission unit 6 is exposed from the cover cabinet 2 in a closed position by setting the transmission unit 6 to the illustrated second rotational posture.

Even if a sound wave from the second speaker 42 vibrates the first speaker 41 through the air in the cover cabinet 2, the sound thus generated will not be input into the microphone 63 with large sound pressure because, as shown in FIG. 16, the sound collecting hole 62 of the transmission unit 6 can face a direction deviating from the first speaker 41 of the cover cabinet 2.

Figure 18:
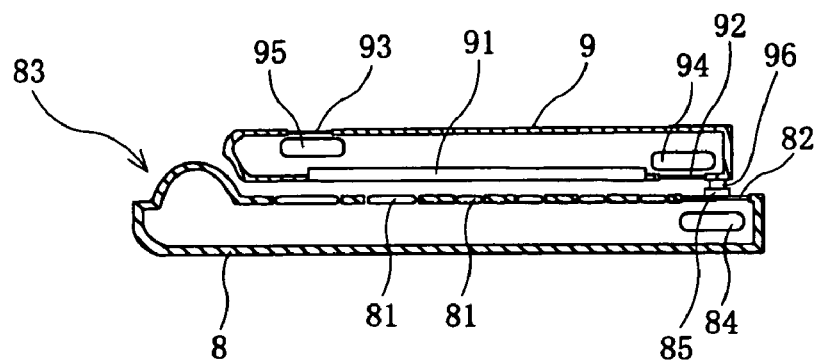
FIG. 18 is a sectional view of the foldable portable telephone in a closed state.

Therefore, a howling phenomenon, where the other party's voice emitted from the second speaker 42 is input through the first speaker 41 into the microphone 63 and transmitted to the other party, is suppressed more sufficiently than in the conventional foldable portable telephone shown in FIG. 18, which gives the other party no displeasure.

The present invention is not limited to the foregoing embodiment in construction but can be modified variously within the technical scope defined in the appended claims. For example, the transmission unit 6 employed in the third foldable portable terminal is rotationally driven by manual operation, but may be rotationally driven by a motor or a solenoid in conjunction with opening/closing of the body cabinet 1 and the cover cabinet 2. Furthermore, the microphone 63 may be rotationally driven by itself, and selectively diverted relative to two sound collecting holes provided in the tube piece 61 fixed to the body cabinet 1.

The invention claimed is:

1. A foldable portable terminal, comprising:
   a body cabinet and a cover cabinet openably/closably coupled to each other;
   a first speaker disposed in the cover cabinet;
   one or more sound emitting holes for passing a sound wave emitted from the first speaker, provided on an inner surface of the cover cabinet in a position opposed to a sound emitting surface of the first speaker;
   one or more openings provided on an inner surface of the body cabinet in a position to be opposed to the sound emitting holes with the both cabinets closed;
   a microphone having a sound collecting surface facing the openings, disposed in the body cabinet;
   a second speaker for emitting a sound wave toward a rear surface of the cover cabinet, disposed in the cover cabinet;
   closing means for closing the sound emitting holes in a closed state of the both cabinets, provided in the cover cabinet.

2. The foldable portable terminal according to claim 1, wherein the closing means comprises detection means for detecting an open state and a closed state of the both cabinets and a shutter mechanism for opening/closing the sound emitting holes in accordance with the detection, the shutter mechanism comprising a shutter member supported so as to be capable of entering between opposed faces of the sound emitting surface of the first speaker and the sound emitting holes, and a drive mechanism for reciprocatingly driving the shutter member in accordance with the detection, the shutter member, with operation of the drive mechanism, entering between the opposed faces to close the sound emitting holes in the closed state of the both cabinets, and escaping from between the opposed faces to open the sound emitting holes in the open state of the both cabinets.

3. A foldable portable terminal, comprising:
   a body cabinet and a cover cabinet openably/closably coupled to each other;
   a first speaker disposed in the cover cabinet;
   one or more sound emitting holes for passing a sound wave emitted from the first speaker, provided on an inner surface of the cover cabinet in a position opposed to a sound emitting surface of the first speaker;
   one or more openings provided on an inner surface of the body cabinet in a position to be opposed to the sound emitting holes with the both cabinets closed;
   a microphone having a sound collecting surface facing the openings, disposed in the body cabinet;
   a second speaker for emitting a sound wave toward a rear surface of the cover cabinet, disposed in the cover cabinet; and
   closing means for closing the sound emitting holes in a closed state of the both cabinets, provided in the body cabinet,
   wherein the openings and the sound emitting holes are provided in positions to be slightly staggered in a closed state of the both cabinets, and the closing means comprises a projection formed within an inner surface area of the body cabinet in a position to face the sound emitting holes in a closed state of the both cabinets, the projection closing the sound emitting holes in the closed state of the both cabinets, and separating from the sound emitting holes with the cover cabinet opened.

4. The foldable portable terminal according to claim 3, wherein the projection is formed from an elastic resin.

5. A foldable portable terminal, comprising:
- a body cabinet and a cover cabinet openably/closably coupled to each other;
- a first speaker disposed in the cover cabinet;
- one or more sound emitting holes for passing a sound wave emitted from the first speaker, provided on an inner surface of the cover cabinet in a position opposed to the first speaker;
- one or more openings provided on an inner surface of the body cabinet in a position to be opposed to the sound emitting holes with the both cabinets closed;
- a microphone disposed in the body cabinet toward the openings;
- a second speaker disposed in the cover cabinet for emitting a sound wave toward a rear surface thereof; and
- a partition wall for partitioning a first area having the first speaker disposed therein and a second area having the second speaker disposed therein, formed between these two areas inside the cover cabinet,
- wherein the partition wall is formed by a rib projecting from one of two inner walls opposed to each other inside the cover cabinet toward the other inner wall, and a cushion member intervening between an end of the rib and the other inner wall.

6. A foldable portable terminal, comprising:
- a body cabinet and a cover cabinet openably/closably coupled to each other;
- a first speaker disposed in the cover cabinet;
- one or more sound emitting holes for passing a sound wave emitted from the first speaker, provided on an inner surface of the cover cabinet in a position opposed to the first speaker;
- one or more openings provided on an inner surface of the body cabinet in a position to be opposed to the sound emitting holes with the both cabinets closed;
- a microphone disposed in the body cabinet toward the openings;
- a second speaker disposed in the cover cabinet for emitting a sound speaker disposed in the cover cabinet for emitting a sound wave toward a rear surface thereof; and
- a partition wall for partitioning a first area having the first speaker disposed therein and a second area having the second speaker disposed therein, formed between these two areas inside the cover cabinet,
- wherein the cover cabinet comprises an inner cabinet half forming the inner surface of the cover cabinet and a rear cabinet half forming the rear surface of the cover cabinet, joined to each other, and the partition wall is formed by a first projection projecting from the inner cabinet half, a second projection projecting from the rear cabinet half and being opposed to the first projection, and a seal member intervening between the both projections,
- wherein the first and second projections are in close contact with the seal member.

7. A foldable portable terminal comprising a body cabinet and a cover cabinet openably/closably coupled to each other; a microphone and a first speaker disposed on inner surfaces of the body cabinet and the cover cabinet, respectively, in positions opposed to each other with the both cabinets closed; one or more sound emitting holes for passing a sound wave emitted from the first speaker; and a second speaker disposed on a rear surface of the cover cabinet; but fails to disclose wherein the microphone is rotatably disposed at an end of the body cabinet and the microphone capable of facing a direction deviating from the cover cabinet in a closed position with the both cabinets closed; a closing means for closing the sound emitting holes in a closed state of the both cabinets, provided in the cover cabinet.

8. The foldable portable terminal according to claim 7, wherein it is possible to set a first call mode for causing the microphone and the first speaker to function with the both cabinets opened and a second call mode for causing the microphone and the second speaker to function with the both cabinets closed, and the microphone is set in the first call mode to a first rotational posture where it faces the inner surface side of the body cabinet, and set in the second call mode to a second rotational posture where it faces a direction deviating from the cover cabinet in a closed position.

9. The foldable portable terminal according to claim 8, wherein the microphone is incorporated in a transmission unit rotatably disposed on an end of the body cabinet, and the transmission unit comprises a sound collecting hole for introducing a sound wave toward the microphone.

10. The foldable portable terminal according to claim 9, wherein the transmission unit is rotationally driven by manual operation.

11. The foldable portable terminal according to claim 9, wherein the transmission unit is rotationally driven by a reciprocation drive device.

* * * * *